United States Patent

Hanson et al.

[15] 3,654,405

[45] Apr. 4, 1972

[54] HANDSET REST ATTACHMENT DEVICE FOR WALL TELEPHONES

[72] Inventors: Marvin M. Hanson; Jose Baltar, both of 4152 E. 10th Ln., Hialeah, Fla. 33013

[22] Filed: June 12, 1970

[21] Appl. No.: 45,610

[52] U.S. Cl. ..... 179/146
[51] Int. Cl. ..... H04m 1/04
[58] Field of Search ..... 179/146

[56] References Cited

UNITED STATES PATENTS 3,209,085 9/1965 Farina ..... 179/146
2,973,411 2/1961 Ingrao ..... 179/146

*Primary Examiner*—William C. Cooper
*Attorney*—Ernest H. Schmidt

[57] ABSTRACT

An attachment device for resting the handset portion of a wall-hung telephone equipment is described, comprising a unitary structure having a back wall portion and two spaced-apart, forwardly-extending wall portions the upper edges of which are formed with recesses for cradling the handset therebetween. The back wall portion is formed along its lower edge with a downwardly-extending lip which is adapted to be pressed down between the wall-hung telephone equipment cover and the mounting wall to secure the device in place without the use of cement, attachment screws or the like.

5 Claims, 4 Drawing Figures

INVENTORS.
MARVIN M. HANSON
JOSE BALTAR

BY Ernest H. Schmidt
ATTORNEY.

HANDSET REST ATTACHMENT DEVICE FOR WALL TELEPHONES

This invention relates to subscriber wall telephones and is directed particularly to a device attachable to the housing of such telephone equipment and providing a cradle for temporarily supporting the handset when removed from the equipment hanger-switch during a telephone call.

In the use of a wall-hung telephone of the type commonly used in kitchens, for example, it is often necessary to leave the telephone to obtain paper or a pencil for making notes, or to call another person to the telephone to receive an incoming call. Since such wall phone equipment has no means other than the hanger-switch for supporting the handset portion of the equipment, which disconnects the circuit when used, it has heretofore been necessary to let the handset hang from its cord while away from the telephone with the circuit open. Such usage of the telephone equipment not only is unhandy, but also places an undue strain on the ends of the handset electrical cord, which could ultimately lead to break-down of the equipment. If, when leaving the telephone equipment with the line open, the handset is accidentally dropped to the floor, it is subject to breakage across the handle portion, which of course also renders the equipment inoperative.

It is, accordingly, the principal object of this invention to obviate the above-described deficiencies of ordinary wall-hung telephone equipment by the provision of an attachment device therefor serving to conveniently cradle the handset temporarily while the telephone line remains open during a call.

A more particular object of the invention is to provide an attachment device of the above nature which attaches simply by pressing in place in seating engagement against the top of the wall-hung equipment housing.

Still another object of the invention is to provide an attachment device of the character described which will be simple in structure, inconspicuous, easy to install, and convenient and durable in use.

Other objects, features and advantages of the invention will be apparent from the following description when read with reference to the accompanying drawings. In the drawings, wherein like reference numerals denote corresponding parts throughout the several views.

Figure 2:
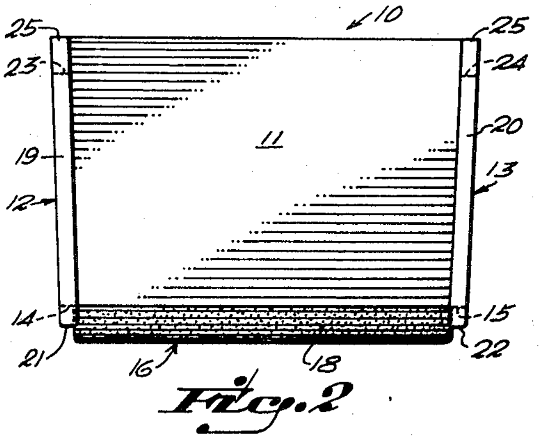
FIG. 2 is a front elevational view of the attachment device.
Figure 3:
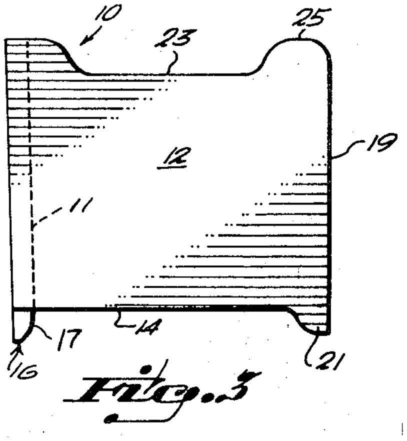
FIG. 3 is a side elevational view thereof.
Figure 4:
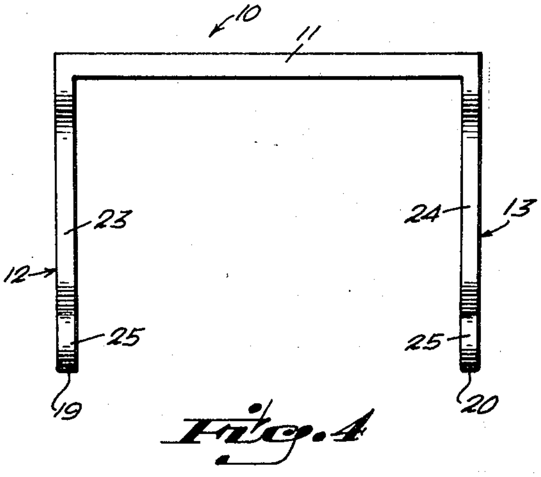
FIG. 4 is a top view thereof.

Referring now in detail to the drawings, 10 designates, generally, a handset rest attachment device embodying the invention. Attachment device 10, which may be integrally formed by injection molding of a tough synthetic plastic material, comprises a flat, substantially rectangular back-plate portion 11, the lateral ends of which merge into an opposed pair of flat, substantially rectangular side plate portions 12, 13 of identical shape as is hereinafter more particularly described. As best illustrated in FIG. 3, the lower end of the back-plate portion 11 extends a short distance beyond the lower edges 14, 15 of the respective side-plate portions 12, 13 to provide a downwardly-extending transverse lip 16. As further illustrated in FIG. 3, the outer end of the lip 16 is arcuately curved or tapered from its front surface to its back surface, as indicated at 17, for the purpose hereinafter appearing. As illustrated in FIG. 2, the forwardly-extending curved surface portion of the lip 16 is roughened, as indicated at 18, for enhanced friction gripping in attachment to the telephone equipment housing, as is hereinbelow more particularly described.

The forward ends of the straight lower edges 14, 15 of the side-plate portions 12, 13 respectively, just short of the outer substantially vertical edges 19, 20 of said side-plate portions merge arcuately into short, downwardly-extending fillet portions 21, 22, respectively. The upper ends of the side-plate portion 12, 13 are formed with comparatively long, shallow recesses 23, 24, respectively, which are preferably curved at their outer ends, as indicated at 25, to merge smoothly with the outer ends of said side-plate portion.

Figure 1:
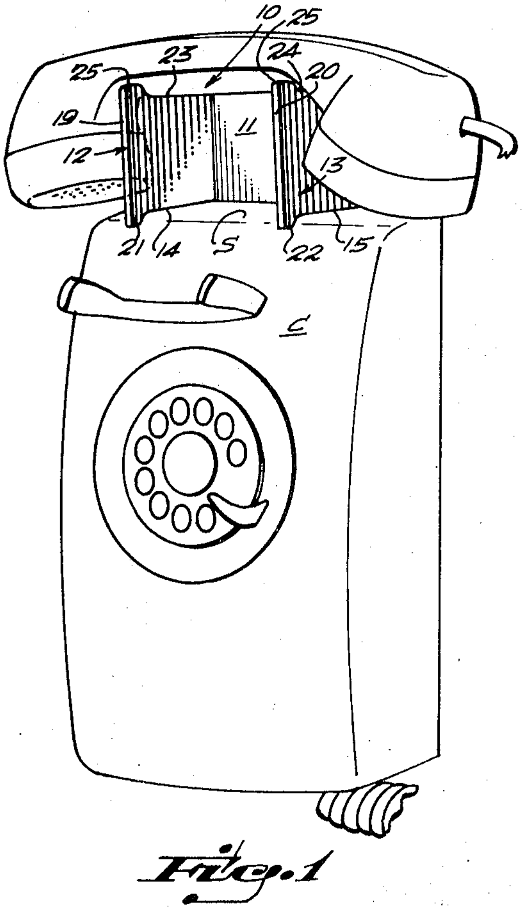
FIG. 1 illustrates, in oblique view, a handset rest attachment device, shown attached to a typical wall-hung telephone equipment and in use in cradling the handset.

Referring now to FIG. 1 and considering the use of the handset rest attachment device, it will be seen that it fits in seating engagement against the top surface S of the housing cover C forming part of the wall-attached telephone equipment. The cover member C is secured to the wall-attached equipment chassis by resilient attachment means, (not illustrated), permitting slight resilient yielding of the cover C in the outward direction. This feature of the wall-hung telephone equipment permits insertion of the lip portion 16 of the attachment device 10 between the back edge of the top surface S of the housing cover C and the wall upon which the equipment is mounted, to be held in secure attachment thereat by the reactive clamping action of said cover. In this connection it is to be noted that the roughened surface 18 of the lip 16 presents a high coefficient of friction with respect to the clamping edge of the equipment cover C to enhance the frictional grip of attachment. When it is desired to temporarily leave the telephone handset unattended for one reason or another during a telephone call, it is only necessary to set it across the top of the attachment device 10 as illustrated in FIG. 1, whereat it will be securely cradled within the recesses 23, 24 at the upper ends of the side-plate portions 12, 13. It will also be noted that the open front end of the device, between the side plate portion 12 and 13, provides an access opening for the hand in conveniently cradling the handset on the attachment device, or removing it. It is further to be noted that each time the handset is thus set in place upon the attachment device 10, the downward force thereby applied to the device, no matter how slight, has a tendency to push the device firmly in its attached position, thereby precluding any likelihood of the device loosening for any reason such, for example, as by the effects of vibration.

While we have illustrated and described herein only one form in which our invention can conveniently be embodied in practice, it is to be understood that this form is presented by way of example only and not in a limiting sense.

The invention, in brief, comprises all the embodiments and modifications coming within the scope and spirit of the following claims.

What we claim as new and desire to secure by Letters Patent is:

1. An attachment device for resting the handset portion of a wall-hung telephone equipment having an equipment chassis securable to a wall and a cover member removably attachable to the chassis, the cover member having a substantially flat upper surface portion the rear edge of which is adapted to fit against the mounting wall, comprising, in combination, a handset cradle member seatable upon the upper surface portion of the equipment chassis member, and friction grip means integrally formed with said cradle member and receivable between the rear edge of the cover upper surface portion and the wall upon which the telephone equipment is hung for securing the attachment device in place, said cradle member comprising a substantially flat back-plate portion, and an opposed pair of flat side-plate portions extending forwardly from each end of said back-plate portion, and said friction grip means comprising a lip extending downwardly along the lower edge of said back-plate portion, said lip having an arcuately tapered front surface portion facilitating insertion between the rear edge of the cover upper surface portion and the wall upon which the telephone equipment is hung, by wedge action.

2. An attachment device as defined in claim 1, wherein said arcuate front surface portion of said lip is of a roughened texture to enhance the friction gripping effect.

3. An attachment device as defined in claim 1, wherein upper edge portions of said side-plate portions are formed with mutually laterally aligned shallow recesses for cradling opposite end portions of the gripping handle of the handset when set in resting position upon the device.

4. An attachment device as defined in claim 3, wherein the contour of the lower edges of said side portions is such as to conform with the shape of the substantially flat upper surface portion of the cover member.

5. An attachment device as defined in claim 3, wherein said arcuate front portion of said lip is of a roughened texture to enhance the friction gripping effect.

* * * * *